[19] United States Patent
Laurent et al.

[11] 4,057,018
[45] Nov. 8, 1977

[54] TRANSFER SYSTEM FOR LONG VEHICLES SUCH AS WAGONS

[75] Inventors: Jacky Adrien Paul Laurent, Douai; Francis Jean-Marie Croix-Marie, Viry Chatillon, both of France

[73] Assignees: Bertin & Cie, Plaisir; Arbel Industrie, Douai, both of France

[21] Appl. No.: 667,087

[22] Filed: Mar. 15, 1976

[30] Foreign Application Priority Data

Mar. 18, 1975  France ............................. 75.08442

[51] Int. Cl.$^2$ ............................................. B61J 1/10
[52] U.S. Cl. ..................... 104/48; 104/23 FS; 104/134; 104/137; 214/1 BE
[58] Field of Search ............ 104/23 FS, 26 R, 48, 104/134, 137, 35, 47, 49, 50, 249, 251, 252, 32 R, 32 A; 180/116, 117, 120; 214/1 BE; 105/159, 177

[56] References Cited

U.S. PATENT DOCUMENTS

| 638,724 | 12/1899 | Knopp | 104/35 |
| 2,017,392 | 10/1935 | Blake | 104/252 X |
| 3,796,162 | 3/1974 | Burdick et al. | 104/23 FS |

FOREIGN PATENT DOCUMENTS

| 468,063 | 10/1928 | Germany | 104/48 |
| 330,361 | 4/1920 | Germany | 104/35 |
| 331,369 | 7/1930 | United Kingdom | 104/49 |

Primary Examiner—Frank E. Werner
Assistant Examiner—Randolph A. Reese
Attorney, Agent, or Firm—A. W. Breiner

[57] ABSTRACT

In order to transfer long vehicles upon a ground surface and more particularly railway carriages or wagons, use is made of platforms which glide over the ground by means of fluid cushions and which carry track sections for receiving vehicle wheels. Two or more such platforms which are movable independently of each other, are mutually positioned so that the respective track sections are in extension of each other and are assigned to the vehicle front wheel system and to the vehicle rear wheel system respectively, each platform being independently lockable with the vehicle.

11 Claims, 11 Drawing Figures

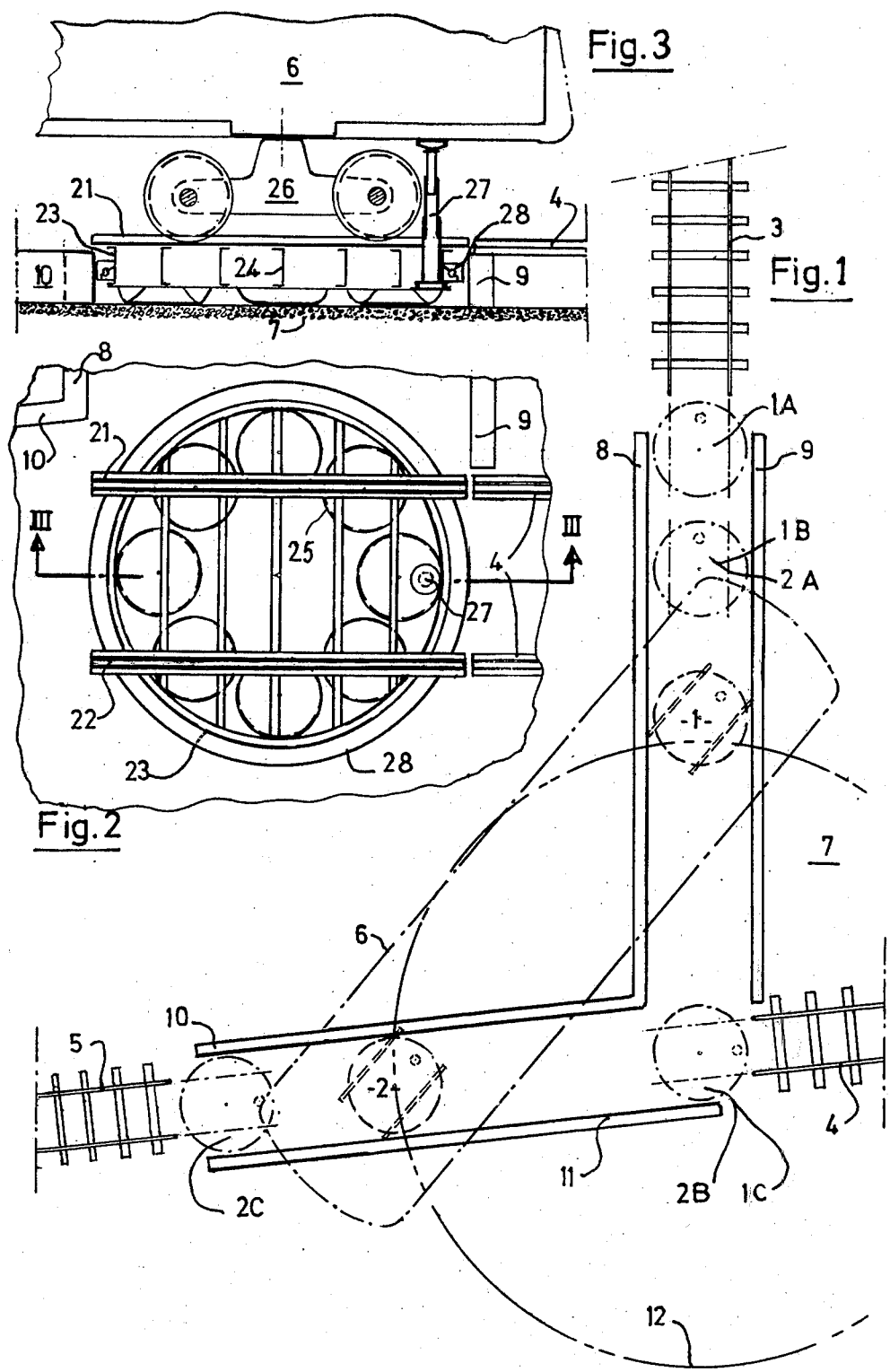

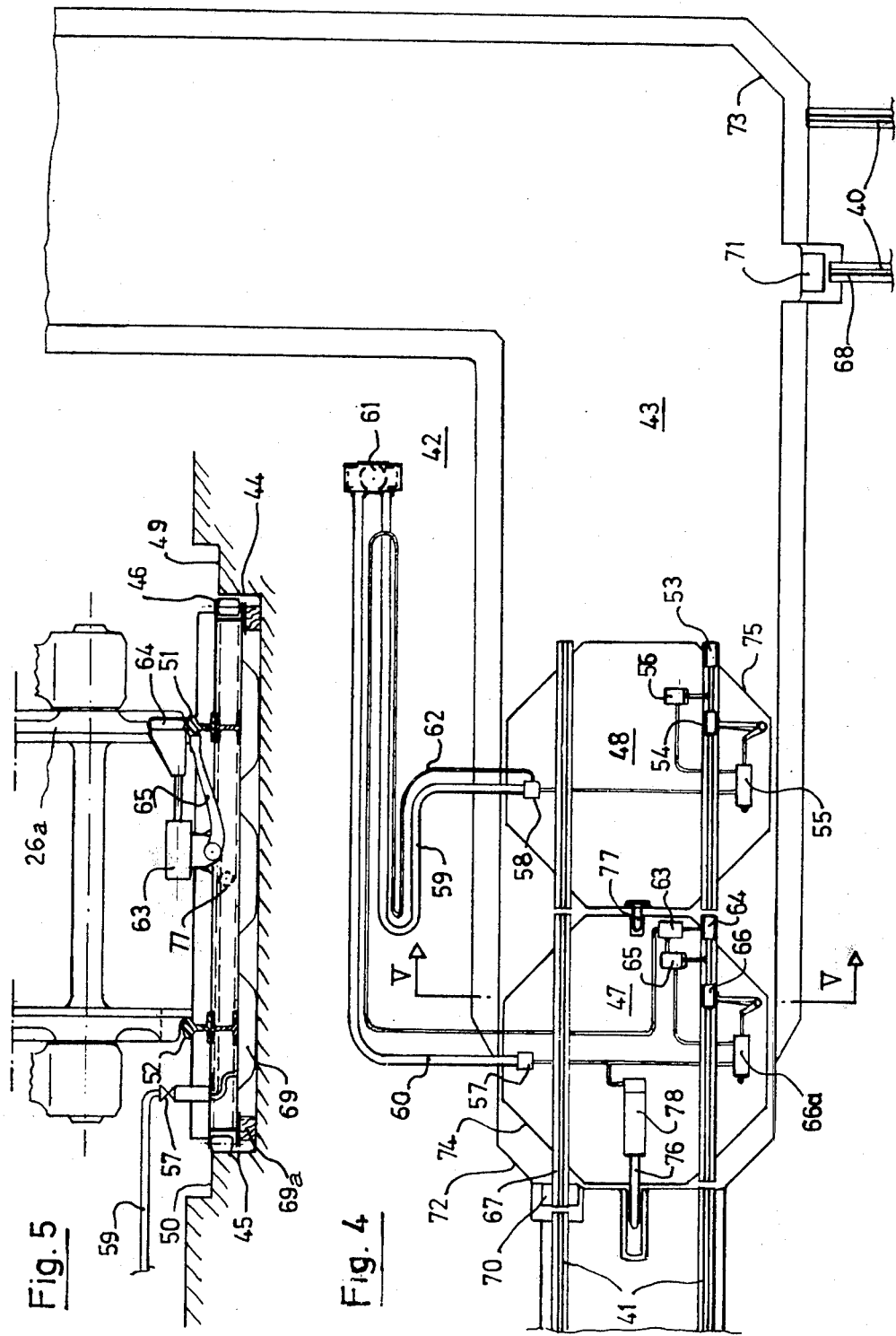

TRANSFER SYSTEM FOR LONG VEHICLES SUCH AS WAGONS

This invention relates to an "in situ" transfer or directional change system for long machines or vehicles, and more particularly for railway vehicles.

Where the latter are concerned, marshalling or stocking yards require cumbersome and fragile accessories such as turntables. When vehicles are very long and very heavy such accessories become costly and difficult to use, or indeed to set up in the available space.

Likewise known is the use of transfer platforms rendered movable relative to the ground by means of fluid cushions which support the wheels of the vehicle on sections of track, as described for example in National Research Development Corporation's French Pat. No. 1,360,952.

In the case of vehicles with a very long wheelbase, however, such platforms become too long, making them costly and heavy.

This invention relates to a method which overcomes the aforementioned drawbacks and which is characterized by the use of two separate platforms which are rendered independently movable relative to the ground through the use of fluid cushions, each platform supporting a section of track capable of extending the other section and each being capable of being made fast with at least one of the vehicle wheels.

As a rule, the same platform is used for a complete vehicle axle or bogie.

Each platform according to the present invention includes at least three fluid cushion systems enabling it to move in all directions over a horizontal surface and is characterized by a section of track capable of extending the track under the vehicle and of receiving at least one wheel thereof, and by a locking system for making said section of track fast with said wheel or said vehicle.

An example of a fluid cushion system usable for carrying the present invention into practice is described in Guibeaud's French Pat. No. 608,256.

As is known, it is a basic feature of such systems that they endow a load with the ability to move without friction in any direction over a horizontal surface when they are fed with fluid under pressure and that when such fluid feed ceases the platform subsides somewhat and rests on the surface with friction, through the medium either of the lips of the cushion or supporting legs.

It is furthermore known that at least three legs are required to support a load in stable fashion, and similarly at least three fluid cushions with independent characteristics are required unless the stability of the load is otherwise ensured. An example of means for obtaining fluid cushions with independent characteristics is described in the Bertin & Cie, French Pat. No. 1,310,483.

It is customary to use the same autostable platform capable of being rigidly united with the vehicle, to receive an axle or even a bogie thereof on the section of track supporting the vehicle.

Autostable, rigidly connectable transfer platforms according to this invention are used in the following way: at least two are arranged to extend in succession one of the three ends of the vehicle track whereby, in the lower position, with the fluid cushions not supplied with fluid, the sections of track which they support are level with said free end. The vehicle is then moved forward to fetch its front wheels over the first and then the second platform resting upon said horizontal transfer surface. The second platform is then made fast with the vehicle and its cushions are fed with fluid. The vehicle is then moved forward once more (which consequently carries the second platform with it) until its rear wheels are on the first platform, which is then made fast and has its cushions likewise fed with fluid. At this point the assembly is in a slightly raised position and supported in stable fashion; it can thus be placed on the horizontal surface, abutting one of the free ends of another track, or else can be turned head to tail at the free end of the first track. The vehicle can then be disengaged by a process which is the reverse of the one hereinabove described.

In order to facilitate such movements and enable them to be carried out safely it is usually desirable to guide the motions of the platform. It is accordingly a teaching of this invention that the platforms each have a circular belt of identical diameter which cooperates with two substantially vertical parallel guiding walls which hug each of the circular belts with a degree of clearance.

Such an arrangement allows the platform to move linearly yet allows them to be swivelled. In accordance with the invention, in order to implement such arrangement in optimum fashion, said guiding walls bound a transfer path running at an angle, often at 90°, each branch of which is a little longer than the wheelbase of the vehicle, thereby enabling the same to be transferred from one branch to the other.

In one form of embodiment, the guiding walls and the transfer path jointly form a pit of substantially rectangular section which extends in platform through one or more angles.

The description which folllows with reference to the accompanying non-limitative exemplary drawings will give a clear understanding of how the invention can be carried into practice.

In the drawings:

FIG. 1 shows in diagrammatic platform a wagon transfer system;

FIGS. 2 and 3 are respectively a top view and a section on an enlarged scale through the line III—III, of a platform according to the invention;

FIG. 4 is a planview of another transfer installation with its two platforms;

FIG. 5 is a section taken through the line V—V of FIG. 4, shown on an enlarged scale;

Figures 6, 7:
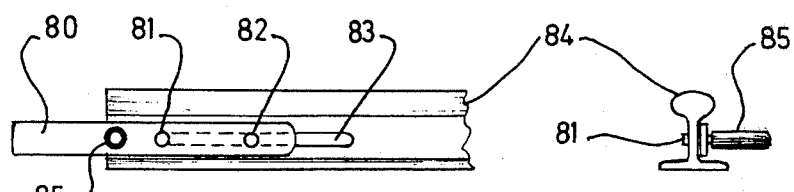
FIGS. 6 and 7 are side elevation and end views respectively of an aligning latch.

Reference is first had to FIG. 1, which shows three railway track ends, 3, 4 and 5. Shown in dot-dash lines are different possible positions of two transfer platforms 1 and 2 placed beneath the wheels of a wagon 6, shown here being transferred by revolving motion relative to the tracks.

As stated in the preamble, fluid cushions, when fed with fluid under pressure, enable each of platforms 1 and 2 to move in any direction over flat surface 7. Such cushions may be fixed into such flat ground 7 over the entire useful transfer surface, or else more economically beneath each platform, each cushion being then fed with compressed air individually, examples of either arrangement being well known to the specialist in the art.

For bounding said useful transfer surface an enabling the assembly being transferred to be more easily guided, recourse is had here to straight, vertical and parallel slideways, 8, 9, 10 and 11 fixed to the ground 7 and hugging with slight clearance identical circular platforms 1 and 2. Each pair of slideways extends one track end, in this case the ends 3 and 5.

It will be appreciated that the transfer surface is much smaller than the surface that would be required for a prior art turntable, which surface is figuratively depicted by the circle 12.

The way in which the subject system of this invention is used has been described in the preamble. In this case the wagon arriving from track 3 first has its front wheels roll on to platform 1 into the position 1A, then on to platform 2 into position 2A whereat it is made fast. Thereafter the wagon is moved foward again while the cushions of platform 2 are fed with fluid, which platform reaches position 2B while at the same time the rear wheels, which were made fast with platform 1, fetch the latter on its fluid cushion into position 1B. This motion was guided by slideways 8 and 9. Next, platform 2 is inserted between slideways 10 and 11, resulting in intermediate positions such as 2 and 1 for the respective platforms, and the ultimate position 2c, 1c, from which the wagon can issue on to either of tracks 4 or 5.

FIGS. 2 and 3 are enlarged-scale showings of platform 1 in the position 1C of FIG. 1. It comprises a track element formed by rail sections 21, 22 supported on a circular angle-member 23 in conjunction with sleepers 24 beneath which are secured eight air cushions 25 supplied from a source of compressed air (not shown).

A wagon portion 6 is shown in FIG. 3 together with a bogie 26 and its wheels running on the rail 21.

A telescopic jack 27 fixed to circular angle-member 23 is capable of bearing forcefully against a strengthened part of the base of wagon 6 whereby to make the latter fast with the platform during the transfer process hereinbefore described. It is to be noted that using its base to make wagon 6 fast with the platform requires the platform rails 21 and 22 and hence bogie 26 to remain aligned with the wagon, thereby facilitating such operations as the final lining up with the ends of tracks 4 or 5.

Also visible on FIGS. 2 and 3 is a large-diameter ball or roller bearing 28 revolving about the circular angle-member 23 and adapted to bear upon slideways 8 and 9. By eliminating friction along the slideways, such antifriction bearing minimizes the bending loads on jacks 27 and the forces tending to shift wagon 6.

The latter can be either pulled or pushed by any convenient means, and if necessary by hand since air cushions are virtually exempt of friction against the ground.

FIGS. 4 and 5 concern a special application involving the placing on a siding 40 of wagons issuing via a track 41 from a construction or repair shop, the tracks being recessed into a cement-covered work area 42.

To enable the inventon to be carried into practice, a pit 43 has been formed on the work area, two branches of which respectively face the tracks 40 and 41 which are in this case right angles to each other.

A platform 47 is shown in side elevation in FIG. 5, which also depicts the profile of pit 43. The latter includes at the bottom two vertical parallel walls 44 and 45 which cooperate with a plurality of rollers 46 encircling the circular angle-member forming the base of each of platforms 47 and 48. At the top of the pit, two shoulders 49, 50 will accommodate oblique movements of rail sections 51, 52 fixed to the platforms, such oblique movements occurring during the revolving motion in the course of a transfer.

Rollers 46 perform the same function as the anti-friction bearing 28 described with reference to FIGS. 2 and 3.

Resting blocks 69a provide support for the platform when the air cushions 69 are not operative. These blocks are fixed to the circular angle-iron and they may be made of beech wood.

In this embodiment, securing of the platforms is effected by means of shoes positioned on the rails, in front of and behind some of the wheels 26a (FIG. 5). Thus platform 48 includes a fixed front shoe 53 and a movable rear shoe 54 which a jack 55 actuates when the wagon wheel activates a pedal 56 as it approaches shoe 53. Operation of the jack triggers opening of a valve 58 which supplies fluid to the air cushions of said platform 48, which air cushions are similar to the air cushions 69 of platform 47 in FIG. 5.

The fluid feed to valve 58 and to the similar valve 57 of platform 47 is effected via flexible lines 59 and 60 connected to a distributor terminal 61 on work area 42.

The opening of valve 58 then initiates the activities of platform 47 via a signal line 62 preferably fixed to the lines 59 and 60 and connecting the actuating means of valve 58 to the control jack 63 of a front movable shoe 64 of platform 47.

The moving of front shoe 64 into its operatie position triggers the activity of pedal 65, which in turn results, through a sequence identical to that previously described with reference to pedal 56 of platform 48, in locking of the wheel by the rear shoe 66 actuated by jack 66 and in the supplying of fluid through opening of valve 57.

The combination of sequences hereinabove described ensures great reliability but requires a fairly slow approach of the wheels towards front shoes 53 or 64. A faster approach can be obtained without danger by supplying fluid to the air cushions beforehand, thereby enabling the platform to slip somewhat as they accompany the wheels into contact with said front shoes. This can be accomplished by each of valves 58 and 57 as soon as the associated pedals 56 and 65 are depressed.

FIGS. 4 and 5 furthermore show asymmetric lengths of the rail ends at the junctions of platform 47 with tracks 40 and 41. The rail section 67 of platform 47 is indeed longer by 0.20 meter than the other rail sections. This feature ensures minimum clearance at the platform junction with the siding 40, for if the two junctions of each rail in this position were to lie in the same transverse plane to the rails, then the slight rotation of platform 47 at the end of the motion would require more clearance at the junction 68 to provide passage for the end of the other rail section of platform 47. Such clearance would be even greater if allowance were to be made for the fact that the platform and the associated bogie are not rigidly united with the wagon during rotation and accordingly tend to lag behind and to thereby assume a degree of obliquity at the end of the motion.

To enable this extended end 67 to be accommodated, the pit 43 is extended at the required places and thrust plates 70, 71 are positioned thereat to prevent bending of the consequently overhanging end 67 on platform 47 and to avoid possible toppling of the platform if it is light enough in weight. It is to be noted that disengagement of the extended end 67 from its position can be effected without difficulty provided that pit 43 is a little longer than the required minimum and that the pit will accommodate a displacement of platform 47 of at least 0.20 meter before platform 48 reaches the other branch of pit 43.

The residual obliquity at the end of the motion, referred to precedingly requires a realignment of the platforms. This is effected, on the one hand, by bevels 72, 73 at the ends of the pit that cooperate with platform superstructures similarly formed with bevels 74, 75, and, on the other, by a guide pin 76 (or 77) on each platform that cooperates with splayed guides at the entrance point, one at the end of track 41 (or 40), the other on platform 47.

In this case pin 76 is movable by a jack 78 which is controlled by the same sequence as valve 57, thereby to enable it to perform a more powerful and more progressive religning action.

Alternatively, the locking of the platform rail sections into alignment with the ends of the tracks can be effected by rail-extending means. FIGS. 6 and 7 illustrate an example of such means. A lock 80 adapted to bear against the rail web of a track end (not shown) is restrained against the web of rail section 84 by bolts 81 and 82 capable of sliding with clearance along a slot 83 formed in the web of said rail section. A grip 85 permits manual actuation.

FIGS. 8 to 11 illustrate exemplary embodiments of guideways or guiding pits 90 adapted to permit various transfers of a vehicle 10 (schematically depicted by a rectangle in dot-dash lines in each figure).

Figures 8, 9:
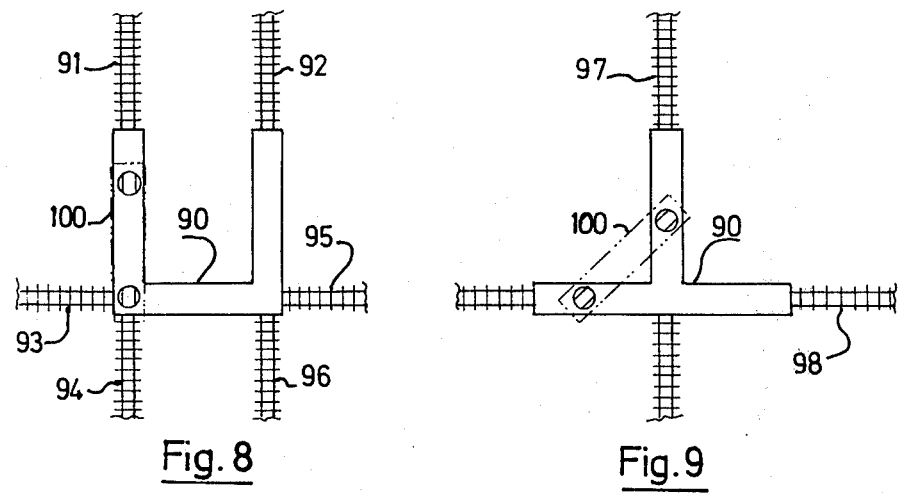
FIGS. 8, 9, 10 and 11 are schematic planview portrayals of various possible transfer operations.

FIG. 8 shows that a pit of small area will allow a large number of branches to be served, there being six branches 91 through 96 shown in the figure.

FIG. 9 shows configuration enabling a vehicle to be turned around on either track 97 and 98.

Figures 10, 11:
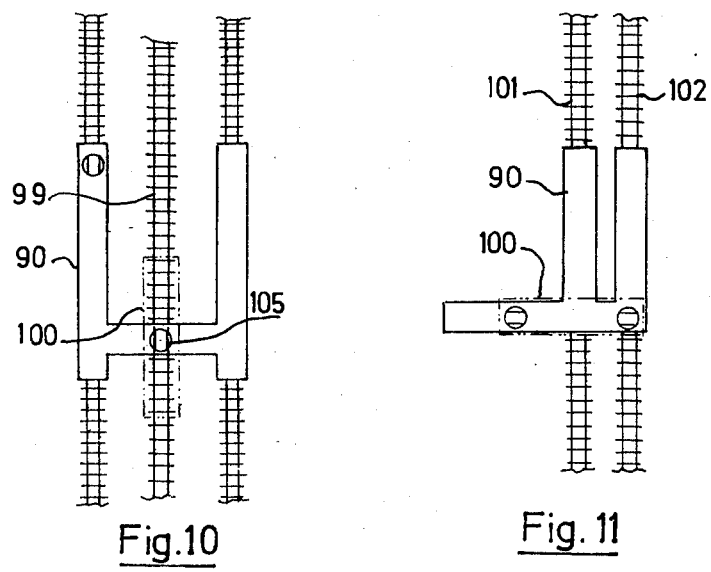

FIG. 10 shows that a pit can be crossed by a track not involved in transfer operations, by disposing a platform 105 across the pit at that point.

Lastly, FIG. 11 shows a configuration permitting transfers between two parallel tracks 101 and 102 which may be as close to each other as the overall width of the vehicles will permit, thereby enabling the layout of marshalling yards or sidings to be simplified.

We claim:

1. A method of marshalling long vehicles upon the ground surface of a marshalling yard, by mans of ground-effect platforms hovering over fluid cushions formed against said ground surface and carrying track sections designed to mate the vehicle wheels,
    wherein the improvement comprises the steps of:
        mutually setting at least two such platforms in consecutive relationship with the respective track sections thereof oriented to extend in register with each other to form a straightaway,
        moving a vehicle over the thus set platforms and positioning the same so that the front wheel system of the vehicle is located on the track section of one of said platforms while the rear-wheel system of the vehicle is located on the track section of another of said platforms,
        securing each platform with the vehicle portion it carries, and
        maneuvering said platforms independently of each other on the respective fluid cushions to marshal said vehicle.

2. A method according to claim 1, comprising the steps of so positioning two platforms that their track sections successively extend a free vehicle track end, advancing the vehicle so that it first rolls on to a first and then a second platform, fastening said second platform with the front-wheel system of the vehicle and supplying cushion fluid to said second platform, advancing still further the vehicle fast with said second platform until its rear-wheel system is fetched on to the first platform, fastening said first platform with the rear-wheel system of the vehicle and supplying cushion fluid to said first platform.

3. A method according to claim 2, wherein the steps are sequenced so that each step triggers the next following step.

4. A method according to claim 1, wherein each platform is constrainedly and independently guided on the ground surface of the marshalling yard.

5. A method according to claim 4, wherein the guiding involves hugging each platform with some degree of clearance between parallel faces.

6. A method according to claim 4, wherein the guiding involves digging a pit into the ground.

7. On the ground surface of a marshalling yard at which a number of vehicle tracks end, a vehicle handling complex designed for marshalling a relatively long wheelbase vehicle having a front wheel unit and a rear wheel unit, comprising two separate and distinct, relatively short, ground-effect platforms commensurate with but a vehicle wheel unit, each of said two ground-effect platforms comprising:
    an open-ended track section having a limited length which is but a small fraction of the vehicle wheelbase and being designed to mate with any of said tracks when the respective platform is positioned adjacent the same, said limited length track section being adapted to accommodate either one of said wheel units,
    alignment means for aligning said track section with the end of any of said tracks, to maintain said track section in register with said track end, and
    means for securing to said platform a vehicle portion thereon.

8. A vehicle handling complex according to claim 7, further comprising a belt member surrounding each of said ground-effect platforms, and guide means on said marshalling yard for engagement by said belt member.

9. A vehicle handling complex according to claim 8, wherein said belt member is circular and in rolling contact engagement with said guide means.

10. A ground-effect platform designed to hover over a fluid cushion system formed against the ground surface of a marshalling yard at which a number of tracks end, said platform comprising:
    a short open-ended track section fitted on said platform and designed to mate with any of said tracks when said platform is positioned adjacent the same, said short open-ended track section being adapted to accommodate either the front or rear wheel system of a tracked vehicle.
    alignment means for aligning said track section with the end of any of said tracks, to maintain said track section in register with said track end,
    means for securing to said platform a vehicle portion thereon, and a belt member surrounding the platform and designed to engage guide means on said marshalling yard.

11. A platform according to claim 10, wherein said belt member is circular and in rolling contact with the guide means.

* * * * *